W. F. PRENTIS.
RECESSING BIT AND PIN DRILL.
APPLICATION FILED NOV. 4, 1907.

918,365.

Patented Apr. 13, 1909.

WITNESSES

W. F. Prentis
INVENTOR
Wilkinson & Fisher
his ATTORNEYS

UNITED STATES PATENT OFFICE.

WALTER FREEMAN PRENTIS, OF ILFORD, ENGLAND.

RECESSING-BIT AND PIN-DRILL.

No. 918,365.  Specification of Letters Patent.  Patented April 13, 1909.

Application filed November 4, 1907. Serial No. 400,610.

*To all whom it may concern:*

Be it known that I, WALTER FREEMAN PRENTIS, a subject of His Majesty the King of Great Britain and Ireland, residing at Ilford, Essex, England, have invented certain new and useful Improvements in Recessing-Bits and Pin-Drills; and I do hereby declare the following to be a full, clear, and exact description of the invention, such as will enable others skilled in the art to which it appertains to make and use the same.

This invention relates to a pin drill and recessing tool of the kind in which the shank is provided with a sleeve or collar having slots or grooves for the reception of cutters, and in which the cutter is held and controlled by a pin portion passing through said collar.

The object of this invention is to provide improved means whereby one holder is adapted to hold a series of cutters of varying sizes and shapes suitable for all classes of work within its range.

According to this invention, the holder, which comprises a chuck or shank portion, a pin portion having a reduced forward end, and a locking collar, is provided with a key portion for centering the cutter, and for fastening the cutter to the holder. The key portion may or may not be an integral part of the cutter.

Figure 1:
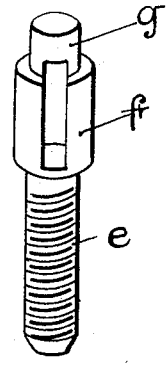
Figure 4:
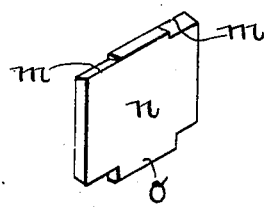
Figure 7:
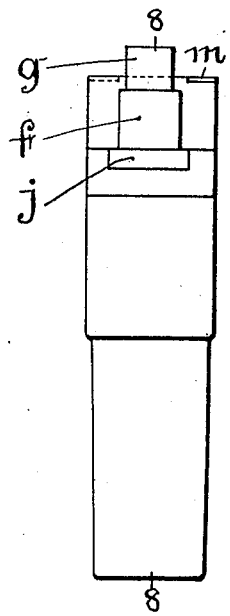
Figure 2:
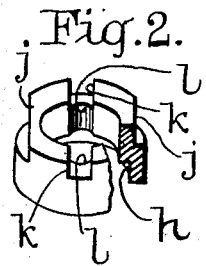
Figure 5:
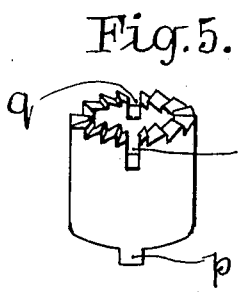
Figure 6:
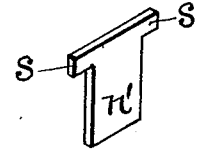
Figure 3:
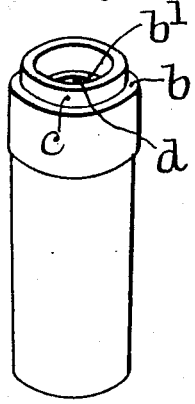
Figure 9:
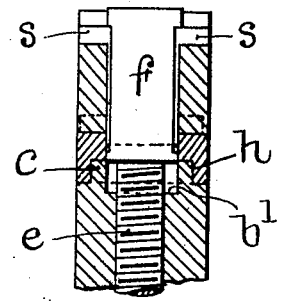
Figure 8:
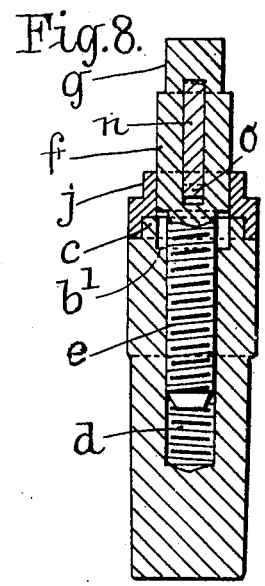

Referring to the accompanying drawings:—Figures 1, 2 and 3 respectively, are perspective views of the pin, collar, and shank. Fig. 4 is a similar view of a combined cutter and key portion. Figs. 5 and 6 respectively, illustrate another form of cutter and a separate key portion. Fig. 7 is an elevational view, and Fig. 8 a longitudinal section taken on the line 8—8 of Fig. 7, of the complete tool with a combined cutter and key portion in position. Fig. 9 is a sectional view of part of the holder with a cutter as shown in Fig. 5.

The shank (Fig. 3) is provided with an end face $b$ and with a projecting annular shoulder or ring $c$, and has an internally screw threaded hole $d$ arranged longitudinally of the shank and concentric with the projecting ring. Said shank is also provided with the face portion $b^1$ within the ring $c$, which may be in the same plane as the outer end face $b$ of the shank or be above or below the level of the same. The sides of the shank may be parallel, morse taper or otherwise.

The pin portion (Fig. 1) has a screw threaded and reduced rear end portion $e$, and preferably a longitudinally slotted head portion $f$, and a reduced forward portion $g$. The rear portion $e$ of the pin engages with the internally screw threaded surface of the shank, and when the head portion $f$ is slotted, it is adapted to receive a cutter of the shape shown in Fig. 4, in which the center and rear portions serve as keys for engaging the slots or grooves in the collar, and thereby securing said pin portion to the collar hereinafter referred to.

The collar (Fig. 2) has an internal diameter of such a size as to enable it to move longitudinally of the head $f$ of the pin portion, and a lower surface having an annular recess $h$ adapted to fit the end face $b$ and ring $c$ of the shank. A pair of flats $j$ are formed on the outer surface of the collar to enable a spanner to engage therewith. The upper surface of the collar has preferably a pair of slots $k$ formed diametrically opposite therein, and the inner surface of the collar may have a pair of grooves $l$ formed therein as shown. The slots are adapted to receive the rear end of the cutter, and the grooves to receive the sides of a reduced or key portion of the cutter. If desired, the grooves $l$ may be dispensed with, and the reduced portion of the cutter made of a width equal to the diameter of the pin.

The cutter shown in Fig. 4 is provided with cutting edges $m$, and a central key portion $n$, against which the outer end of the head bears when the cutter is held in position. The key portion is extended as a reduced portion $o$ at the rear end of the cutter, and affords a means of positioning the cutter centrally of the tool, by engaging with the internal surface of the collar.

The cutter shown in Fig. 5, is provided at its rear end with projections $p$, and at its forward end with notches $q$. The projections $p$ are adapted to take into the slots $k$ of the collar (Fig. 2) and the notches $q$ are adapted to receive the lugs $s$ of the key portion $n'$ (Fig. 6). The key portion $n'$ of the separate key shown in Fig. 6, is of a width corresponding to the internal diameter of the collar as shown in Fig. 9, and is also made to fit the internal diameter of the circular cutter (Fig. 5). By this means a circular cutter may be fixed to a holder of the type described and also be mounted concentrically on the pin portion. It may be remarked that the projections $p$, and the slots $k$ of the collar, can be dispensed with when the key portion of the cutter is adapted to take into the grooves $l$ of the collar.

A cutter of the form shown in Fig. 4, is fitted in position by partly releasing the pin portion from the shank, placing the cutter in the slotted head $f$ so that the rear end engages with the internal diameter of the collar, and also if desired with the slots $k$ therein, and screwing the pin portion into the shank through the medium of the collar operating in conjunction with the key portions of the cutter in the pin portion.

To fix in position, a cutter of the form shown in Fig. 5, remove the pin portion, place the key $n'$ (Fig. 6) in the slotted head $f$ and slide the cutter on over the said head and over the key $n'$, then slide the collar on over said head or pin portion so that it engages with, either the key portion, or the projections of the cutter, or both, then screw the pin portion into the shank by means of the collar. In this and in the other cases the collar acts to space the cutter from the end of the shank; and since it fits the end face $b$, and collar $c$ of said shank, as well as the enlarged portion $f$ of said pin, it serves to brace said cutters against side thrusts or strains; and to transmit said strains directly to said shank.

What is claimed is:—

1. In a pin drill and recessing tool adapted to hold a variety of cutters and to prevent the same from working loose when in use, the combination of a shank; a collar adapted to receive a variety of cutters, provided with a lower face adapted to fit the end of said shank, and having a slot; a pin portion provided with a reduced lower end adapted to pass through said collar and to fit the recess of the shank, and having an enlarged tool holding portion above and fitting said collar; and a cutter held by said enlarged portion and provided with a part adapted to engage the slot in said collar, the whole being so arranged that the collar acts to brace said cutter, substantially as described.

2. In a pin drill and recessing tool adapted to hold a variety of cutters and to prevent the same from working loose when in use, the combination of a shank provided with a recess, an end face, a projecting annular shoulder and a face portion $b'$ within said shoulder; a collar provided with a lower face adapted to fit said end face, and with an annular recess adapted to fit said annular shoulder, and also having a plurality of slots; a pin portion provided with a reduced lower end adapted to fit said recess, having an enlarged tool holding portion, the lower end of which is adapted to engage said face portion $b'$, and a slot in said tool holding portion; a cutter having means rigid therewith for engaging the slots in said collar; and means fitting in said slot for holding said cutter in position, said collar adapted to brace said cutter while in action, substantially as described.

3. In a pin drill and recessing tool, the combination of a recessed shank; a pin portion adapted to fit said shank and provided with an enlarged slotted head; a collar adapted to receive a variety of cutters and fitting said enlarged head of the pin portion and provided with slots; and a cutter fitting said slots in the collar and also said slot in the enlarged head, substantially as described.

4. In a pin drill and recessing tool, the combination of a screw threaded recessed shank; a pin portion provided with a reduced screw threaded portion fitting said shank, and with an enlarged head portion provided with a slot; a collar fitting said enlarged head portion provided with slots and with an annular recess fitting said shank; and a cutter provided with portions fitting the slots in said collar and said head portion, substantially as described.

In testimony whereof, I affix my signature, in presence of two witnesses.

WALTER FREEMAN PRENTIS.

Witnesses:
A. SPARROW,
E. HARRISON.